United States Patent [19]

Mueller et al.

[11] Patent Number: 4,742,666

[45] Date of Patent: May 10, 1988

[54] METHOD AND APPARATUS FOR FORMING TAMPER-EVIDENT CONTAINERS

[75] Inventors: Martin J. Mueller, Palm Harbor; Carl Arndt, Clearwater, both of Fla.

[73] Assignee: Osgood Industries, Inc., Oldsmar, Fla.

[21] Appl. No.: 84,686

[22] Filed: Aug. 12, 1987

[51] Int. Cl.⁴ .................... B65B 53/06; B67B 5/00
[52] U.S. Cl. ............................ 53/442; 53/488; 53/557; 53/329
[58] Field of Search ............... 53/442, 478, 487, 488, 53/329, 557, 290

[56] References Cited

U.S. PATENT DOCUMENTS

| | | | |
|---|---|---|---|
| 3,113,874 | 12/1963 | Baush et al. | 53/442 |
| 3,257,769 | 6/1966 | Ford | 53/442 |
| 3,354,604 | 11/1967 | Amberg et al. | 53/329 X |
| 3,426,504 | 2/1969 | Christensson | 53/329 X |
| 3,460,317 | 8/1969 | Carter et al. | 53/329 |
| 3,792,566 | 2/1974 | Kinney | 53/329 X |
| 3,838,550 | 10/1974 | Mueller | 53/329 X |
| 3,962,844 | 6/1976 | Gordon | 53/329 X |
| 4,065,908 | 1/1978 | Mueller | 53/329 X |
| 4,562,688 | 1/1986 | Mueller | 156/69 |
| 4,566,923 | 1/1986 | Mueller | 53/442 |

*Primary Examiner*—Horace M. Culver
*Attorney, Agent, or Firm*—Dressler, Goldsmith, Shore, Sutker & Milnamow, Ltd.

[57] ABSTRACT

A method and apparatus for forming tamper-evident, sealed containers are disclosed. A plurality of filled containers are respectively fitted with generally annular, heat-shrinkable seal members, with the seal members heated by passage through a heat tunnel so that they shrink into conformance with the respective containers. In order to further conform the heat-shrinkable members to the containers, the containers are passed beneath a rotatably driven, resiliently deformable foam roller assembly, which engages each seal member, and urges it downwardly into further conformance with its respective container. In the preferred form, the roller assembly is driven so that its peripheral speed is less than the speed at which the sealed containers are moved therebeneath.

11 Claims, 2 Drawing Sheets

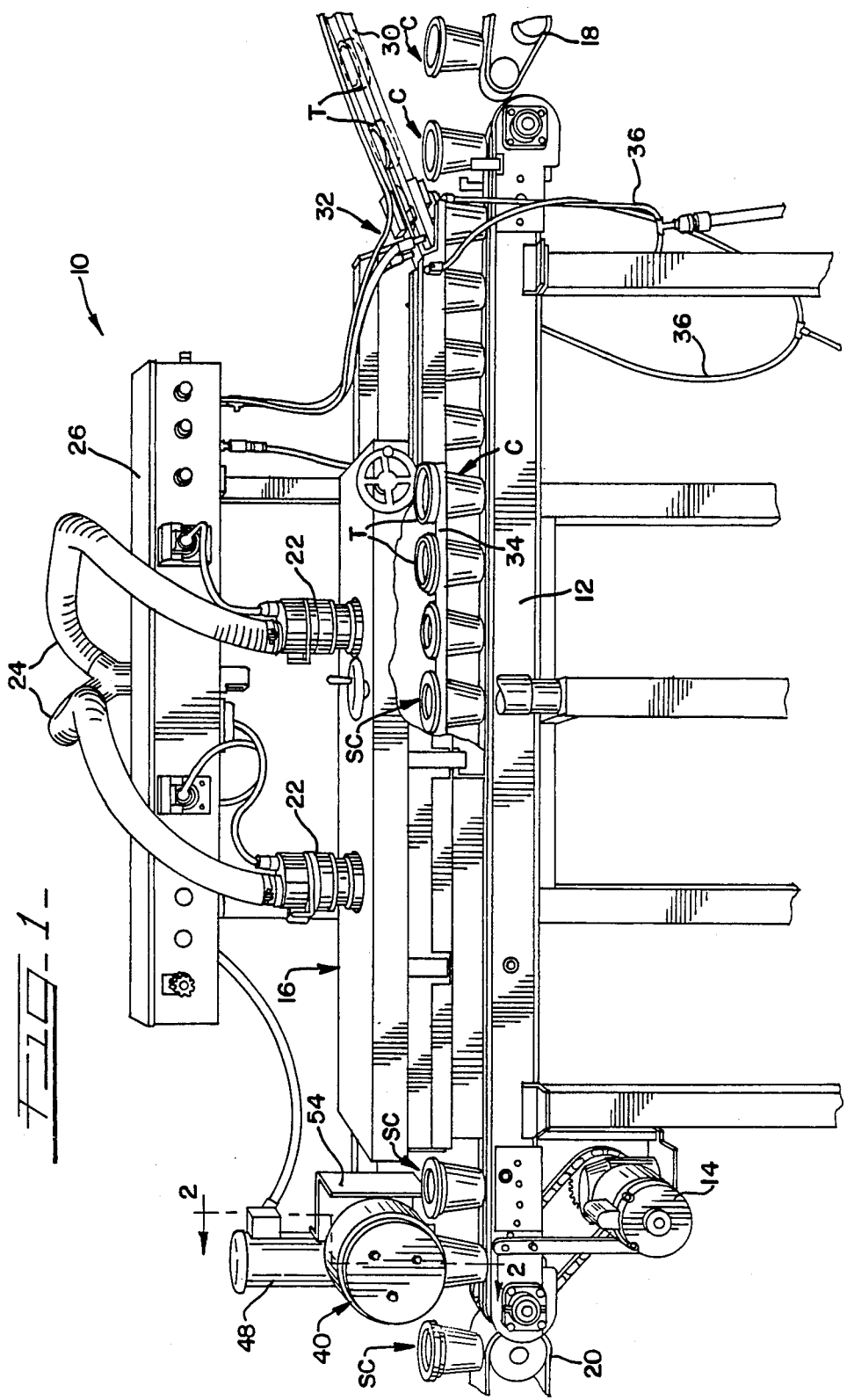

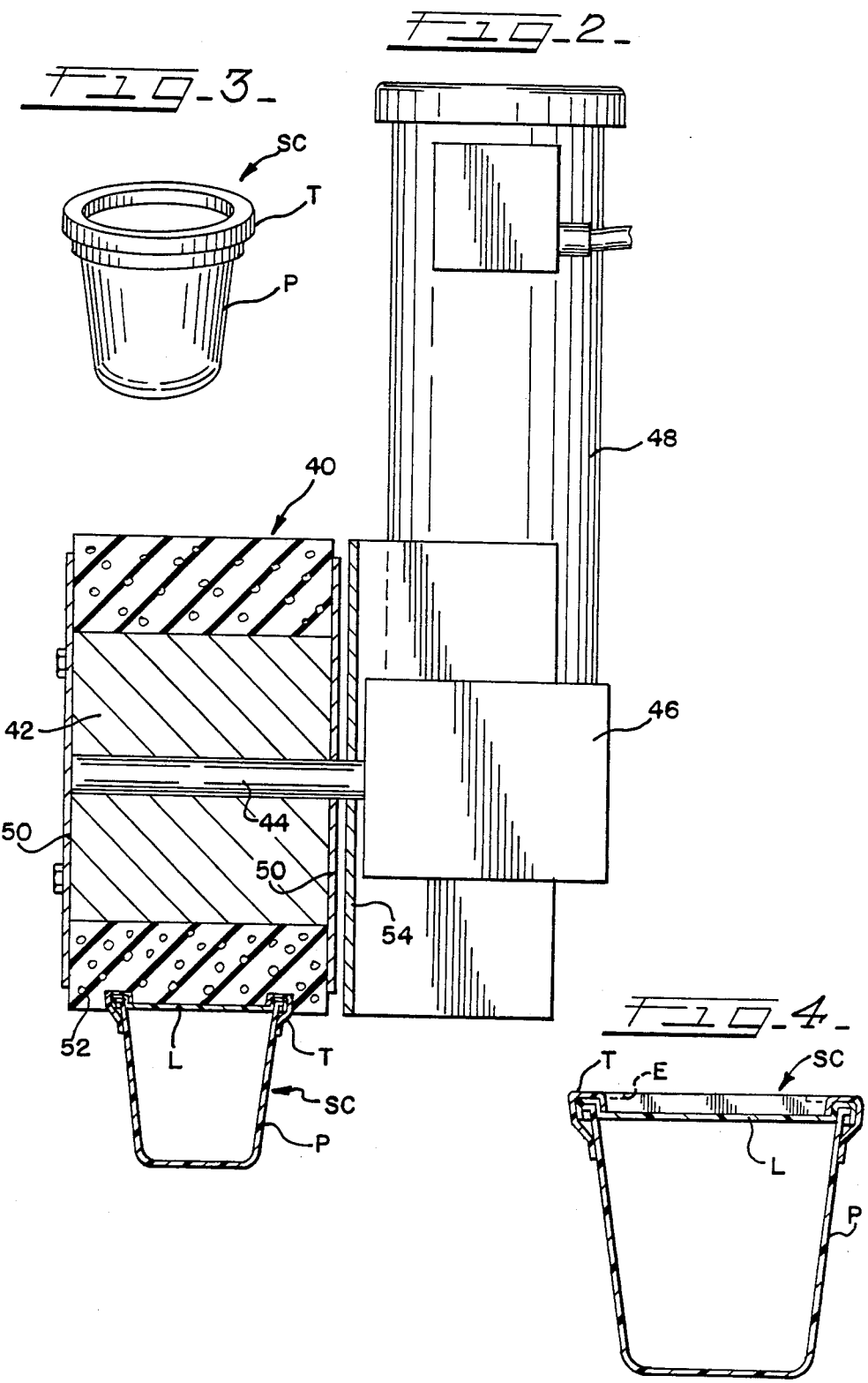

METHOD AND APPARATUS FOR FORMING TAMPER-EVIDENT CONTAINERS

TECHNICAL FIELD

The present invention relates generally to the formation of tamper-evident packages, and more particularly to a method of applying heat-shrinkable members to containers, including using a deformable roller to enhance conformance of the heat-shrinkable members to the containers.

BACKGROUND OF THE INVENTION

The use of tamper-evident containers for consumer products including foods, beverages, pharmaceuticals, and the like deters any tampering with the products, and assures consumers that a package's contents are fresh and unadulterated. To this end, generally annular, heat-shrinkable tamper-evident seals are in widespread use in view of their economy and versatility. Seals of this nature typically comprise molecularly oriented plastic material which is subject to shrinkage upon heating. A shrinkable seal member is ordinarily fitted to a container after filling with product, with the member thereafter heated and shrunk into conformance with the container, typically so as to embrace the lid or other closure member of the container. In this manner, removal of the lid or other opening of the container requires fracturing and partial or complete removal of the tamper-evident seal, thus providing clear visual evidence of opening.

One particularly desirable type of heat-shrinkable seal member is disclosed in U.S. Pat. application Ser. No. 827,208, filed Feb. 4, 1986, now U.S. Pat. No. 4,691,835, with this type of seal desirably lending itself to high-speed manufacture and economical use. Economical use of this type of seal member is facilitated by the technique for applying the members to containers which is disclosed in U.S. Pat. No. 4,562,688, issued Jan. 7, 1986. Portions of the No. 4,562,688 patent document not inconsistent with the present disclosure are incorporated herein by reference.

While the seal member forming and applying techniques of the above patents are highly effective for forming tamper-evident containers and have proven commercially successful, the configuration of the particular type of container to which the seals are being applied can complicate the desired conformance of the seals to the containers. For example, many types of containers typically define a central, recessed region or area at the upper lid portion thereof. By way of example, containers used for different dairy products frequently include lid portions which define a central recess.

When fitting heat-shrinkable seal members to such containers, the seal member is typically positioned so as to encircle the lid portion and an adjacent region of the lower container portion, and is then heated so as to shrink inwardly into conformance with the container. Attendant to heat-shrinkage in this manner, the upper edge portion of the typically generally cylindrical seal contracts generally inwardly and downwardly during heating.

When completely shrunk, this edge portion of the seal is ordinarily inwardly oriented, and depending upon the dimensions of the seal and the container, may partially overlap or overlie the central recess in the container portion. While this ordinarily does not impair the function of the seal, this overlapping edge portion can permit dirt or other debris to undesirably become trapped and collect beneath the edge portion of the seal. Naturally, this can be unattractive, and detract from a product's consumer appeal, a particularly important consideration with regard to consumer food products and the like.

Accordingly, it is desirable to provide a technique for forming tamper-evident sealed containers, wherein heat-shrinkable seals applied to the containers are tightly conformed to the containers to obviate problems of debris being caught between the seals and the containers.

SUMMARY OF THE INVENTION

In accordance with the present invention, a method and an apparatus for forming tamper-evident sealed containers are disclosed wherein generally annular, heat-shrinkable seal members are positioned in respective association with previously-filled containers. In accordance with the invention, heat-shrink fitment of the seal members to the containers is effected, with each seal member thereafter brought into engagement with a resiliently deformable foam roller which urges each heat-shrinkable member into further conformance with its respective container.

In accordance with the illustrated embodiment of the present invention, a product conveyor is provided which is arranged to serially convey a plurality of containers after they have been filled, with each container defining a central recess generally at the upper extent thereof. A supply of generally annular, heat-shrinkable seal members are provided for respective positioning on the containers, with the present apparatus including a vacuum transfer mechanism for successively holding the seal members, and transferring each onto its respective container.

The product conveyor is positioned in operative association with a heat tunnel, which effects heating of the heat-shrinkable members so that they shrink into conformance with the containers. By this action, each seal member embraces its respective container, and in the illustrated embodiment, is arranged to shrink about the lid portion of the container so that removal of the lid portion requires clear visual deformation of the seal member by its partial or complete removal.

In accordance with the present invention, a resiliently deformable foam roller is provided beneath which the containers and the seal members are moved after heating of the seal members. The foam roller is dimensioned so as to substantially span the recessed central area at the upper extent of each container. Thus, as the containers and seal members are moved beneath the roller, the roller engages each seal member and urges it downwardly into the recessed area. Each seal member is thus urged into further conformance with its container, thereby eliminating gaps or spaces between the seal member and the container within which dirt or debris might otherwise collect.

In order to enhance the downward deformation of each seal member which is effected by the foam roller, the present invention contemplates that the roller be rotatably driven so that its peripheral speed is less than the speed at which the containers are moved relative thereto by the associated product conveyor. In the preferred form, the peripheral speed of the foam roller is between about 75% and 95% of the speed at which the containers are moved. This relationship has been found to desirably force the foam material down into the recess defined by the container, thus enhancing the desired conformance of each seal member to its container.

In order to promote plastic deformation of each heat-shrinkable seal member without fracture, it is desirable that engagement of the seal members with the foam roller be effected while the seal members are still at an elevated temperature. Accordingly, and as shown in the illustrated embodiment, the deformable foam roller is positioned immediately downstream of the heat tunnel which effects heating and shrinking of the seal members. To promote long and reliable service life, the present apparatus preferably includes a heat shield operatively positioned between the heat tunnel and the foam roller for shielding the roller from the heat energy which is applied to the heat-shrinkable members.

Other features and advantages of the present invention will become readily apparent from the following detailed description, the accompanying drawings, and the appended claims.

BRIEF DESCRIPTION OF THE DRAWINGS

FIG. 1 is a perspective view of an apparatus for forming tamper-evident containers embodying the principles of the present invention;

FIG. 2 is a view partially in cross-section taken along lines 2—2 of FIG. 1 illustrating a deformable roller assembly in accordance with the present invention;

FIG. 3 is a perspective view of a tamper-evident, sealed container formed in accordance with the present invention; and FIG. 4 is a vertical, cross-sectional view of the sealed container shown in FIG. 3.

DETAILED DESCRIPTION

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

With reference now to the drawings, therein is illustrated an apparatus 10 for forming tamper-evident sealed containers in accordance with the present invention. With particular reference to FIGS. 3 and 4, an exemplary sealed container SC is shown which has been formed in accordance with the present invention. The container includes a lower cup-like portion P, which receives the contents of the container, and a closure member in the form of a generally circular lid portion L configured to be fitted to the upper annular rim of the lower portion P. As is evident, lid portion L is of a typical configuration, and defines a central recess or depressed region.

For purposes of tamper-indication, sealed container SC includes a generally annular frangible tamper-evident seal T. Prior to heat-shrink fitment of seal T to the container, the seal is ordinarily configured to be generally cylindrical, exhibiting substantial heat-shrinkability in a radial direction to facilitate heat-shrink conformance to a container. Reference will be made herein to formation of containers of a configuration such as sealed container SC, but it will be appreciated that the principles of the present invention can be readily applied to a wide variety of differently sized and configured containers.

With particular reference to FIG. 1, the present apparatus includes a product conveyor 12 driven by conveyor motor 14 for conveying a plurality of serially presented containers through the apparatus 10, which includes a generally elongated heat tunnel 16. Containers C to which tamper-evident seals T are to be respectively fitted are directed to the conveyor 12 of apparatus 10 from feed conveyor 18, with the sealed containers SC conveyed from the apparatus to other processing equipment by exit conveyor 20.

As will now be described, apparatus 10 is arranged to position a plurality of seal members T in respective association with containers C after they have been filled with product. The apparatus thereafter effects heating of the seal members so that they shrink into conformance with the respective containers. The present apparatus further includes means whereby the seal members are urged into further conformance with the containers.

To this end, the heat tunnel 16 of the apparatus 10 is provided with air at elevated temperatures by means of heaters 22 to which air is ducted through air ducts 24 so that the air is heated as it is blown into the heat tunnel. The heaters 22 are operatively connected with suitable controls at control panel 26, which is further connected with other mechanisms of the apparatus for coordinating operation and advancement of containers through the apparatus on conveyor 12.

Referring to the orientation of FIG. 1, the arrangement for positioning each seal member T in respective association with containers C is shown at the right-hand portion of the drawing. A feed magazine 30 is configured to hold a supply of the generally cylindrical seal members T for gravity-feed of the members to a vacuum transfer mechanism generally designated 32. In accordance with the teachings of U.S. Pat. No. 4,562,688, the transfer mechanism 32 preferably includes a pair of opposed vacuum ports between which seal members T are gravity-fed from magazine 30, with the vacuum ports being positioned just above the path of the containers C. By this arrangement, each seal member T is releasably held at an acute angle so that a forward edge thereof extends generally into the path of the moving containers C. Each container C thereby engages its respective seal member T, withdrawing it from the vacuum mechanism whereby another seal member T advances to and is releasably held by the vacuum ports for the next successive one of the containers.

As noted, it is desirable that each seal member T be arranged to embrace the lid portion of each container C. To achieve this without making each seal member unnecessarily large, the present apparatus includes a pair of cooled support rails 34 between which containers C are moved by conveyor 12. Support rails 34 maintain the seal members T at the desired vertical positioning relative to the associated containers as the containers move past transfer mechanism 32 into heat tunnel 16. Coolant supplied to the support rails by coolant lines 36 acts to prevent premature shrinkage of the seal members, as well as adherence of the seal members to the support rails. As will be appreciated, support rails such as 34 need not be employed for all applications, such as when each container defines a shoulder or the like upon which its respective seal member can rest as it moves into the heat tunnel.

By virtue of the oriented plastic material from which seal members T are typically formed, the seal members quickly shrink into conformance with the containers under the influence of the heat energy in heat tunnel 16. The seal members T are ordinarily arranged to exhibit substantial heat-shrinkability in a radial direction, and accordingly, shrink inwardly toward the container to embrace its lid portion L, and otherwise conform to the contour of the container so that removal of the lid portion requires partial or complete removal of the seal member T. As the containers pass out of the heat tunnel 16, they appear generally as in FIG. 4, except that the originally upwardly extending edge portion of each seal member extends generally inwardly, as shown in phantom line at E, to overlap the recess defined by the central portion of lid portion L.

As will be appreciated, the manner in which edge portion E of the seal member T is spaced from the central surface of lid portion L can undesirably permit dirt or other debris to become trapped beneath the inwardly extending edge portion E. In accordance with the present invention, apparatus 10 is particularly configured to urge this edge portion E downwardly into the recess in the lid portion, thus further conforming the seal member T to the container.

With further reference to FIG. 1, and referring particularly to FIG. 2, the present apparatus includes a foam roller assembly 40 for further effecting the desired conformance of each heat-shrinkable seal member T to its respective container. Notably, the foam roller assembly 40 is of desirably straightforward construction, including a hub 42 operatively connected with a drive shaft 44 driven via right-angle drive 46 by drive motor 48. The roller assembly further includes a pair of side plates 50 between which is positioned an annular, deformable foam element 52 positioned for engagement with the seal member T on each container which has passed beneath the roller assembly by product conveyor 12.

As is evident from FIG. 2, annular foam element 52 of the roller assembly is dimensioned so as to substantially span the recess defined by the lid portion L of each container, with the roller assembly positioned vertically relative to product conveyor 12 so that foam element 52 is urged downwardly into the recess at the top of each container. By this arrangement, the inner edge portion of each heat seal member T is urged downwardly into the recess, thus further conforming each heat seal member to its respective container. As a consequence, the chance of any debris becoming caught beneath the edge portion of the seal member is substantially eliminated.

In a current embodiment of the present invention, a heat-resistant closed-cell, polyurethane foam has been employed for foam element 52, with the material preferably exhibiting a durometer of 40-70. The overall diameter of roller assembly 40 has been selected to be about 9 inches, with the foam element 52 having a thickness of approximately 1.5 inches.

While it is desired that the speed at which drive motor 48 rotates roller assembly 40 is coordinated with the speed of product conveyor 12, it is important to note that the roller assembly is preferably driven so that the peripheral speed of the foam roller assembly is less than the speed at which conveyors are moved therebeneath by product conveyor 12. Specifically, it has been found that the resiliently deformable foam of the roller assembly best urges the heat-shrinkable member T into conformance with its respective container when the roller assembly is driven so that its peripheral speed is between about 75% and 95%, and most preferably about 85%, of the speed at which the containers are moved down the product conveyor.

In applying tamper-evident seals to containers, it is important that the seals not be subjected to any substantial damage or the like so that they do not improperly indicate tampering. Thus, deformation of the seal members T effected by foam roller assembly 40 is preferably achieved while the seam members are still at elevated temperatures (from heat tunnel 16), and are thus subject to plastic deformation without fracture or other failure. To this end, the foam roller assembly is positioned immediately downstream of heat tunnel 16. Since the closed-cell foam from which the roller assembly is formed can be subject to some heat-degradation, the present apparatus is preferably provided with a heat shield 54 which may comprise a suitable stainless steel member or the like, with the heat shield operatively positioned between the heat tunnel and the roller assembly for shielding the roller assembly from the heat energy imparted to seal members T in the heat tunnel.

From the foregoing, it will be observed that numerous modifications and variations can be effected without departing from the true spirit and scope of the novel concept of the present invention. It is to be understood that no limitation with respect to the specific embodiment disclosed herein is intended or should be inferred. The disclosure is intended to cover by the appended claims all such modifications as fall within the scope of the claims.

What is claimed is:

1. A method of forming tamper-evident, sealed containers, comprising the steps of:
   providing a plurality of containers;
   providing a plurality of generally annular, heat-shrinkable members;
   positioning said heat-shrinkable members in respective association with said containers;
   heating said heat-shrinkable members so that the members shrink into conformance with said containers; and
   deforming each said heat-shrinkable member with resiliently deformable roller means into further conformance with the respective one of said containers by moving said containers beneath said roller means for engagement of said roller means with each said heat-shrinkable member.

2. A method of forming tamper-evident containers in accordance with claim 1, wherein
   each said container defines a recess generally at the upper extend thereof, said deforming step including urging each heat-shrinkable member downwardly into the recess of the respective container with said deformable roller means.

3. A method of forming tamper-evident containers in accordance with claim 2, wherein
   said deformable roller means is dimensioned to substantially span the recess defined by each said container.

4. A method of forming tamper-evident containers in accordance with claim 1, wherein
   said containers are moved at a first speed relative to said roller means, said deforming step including rotatably driving said roller means so that the peripheral speed of said roller means is less than the speed at which said containers are moved.

5. A method of forming tamper-evident containers in accordance with claim 4, wherein
said peripheral speed of said roller means is between about 75% and 95% of the speed at which said containers are moved.

6. A method of forming tamper-evident containers in accordance with claim 1, including
shielding said deformable roller means from heat energy applied to said heat-shrinkable members with heat shield means positioned in operative association with said roller means.

7. An apparatus for forming tamper-evident sealed containers, comprising:
conveyor means for conveying a plurality of containers;
magazine means for holding a plurality of generally annular, heat-shrinkable members;
transfer means for transferring each said heat-shrinkable member from said magazine means for positioning in respective association with said containers;
heating means for heating said heat-shrinkable members so that the members shrink into conformance with said containers; and
resiliently deformable roller means beneath which said containers are moved by said conveyor means after heating of said heat-shrinkable members, said roller means being positioned for engagement with said heat-shrinkable members for urging each said member into further conformance with the respective one of said containers.

8. An apparatus for forming tamper-evident containers in accordance with claim 7, wherein
each said container defines a recess generally at the upper extent thereof, said deformable roller means being configured to urge each said heat-shrinkable member downwardly into the recess of the respective one of said containers.

9. An apparatus for forming tamper-evident containers in accordance with claim 8, wherein
said deformable roller means is dimensioned to substantially span the recess defined by each said container.

10. An apparatus for forming tamper-evident containers in accordance with claim 7, including
means for rotatably driving said deformable roller means so that the peripheral speed of said roller means is less than the speed at which said containers are moved beneath said roller means by said conveyor means.

11. An apparatus for forming tamper-evident containers in accordance with claim 7, including
heat shield means positioned in operative association with said roller means for shielding the roller means from said heating means.

* * * * *